(12) United States Patent
Achten et al.

(10) Patent No.: US 11,130,278 B2
(45) Date of Patent: Sep. 28, 2021

(54) PRINT HEAD, METHOD AND SYSTEM FOR 3D PRINTING HAVING VARIABLE DISCHARGE RATE

(71) Applicant: Covestro Deutschland AG, Leverkusen (DE)

(72) Inventors: Dirk Achten, Leverkusen (DE); Thomas Büsgen, Leverkusen (DE); Levent Akbas, Witten (DE); Nicolas Degiorgio, Krefeld (DE); Jonas Künzel, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 103 days.

(21) Appl. No.: 16/488,670

(22) PCT Filed: Feb. 27, 2018

(86) PCT No.: PCT/EP2018/054791
§ 371 (c)(1),
(2) Date: Aug. 26, 2019

(87) PCT Pub. No.: WO2018/158239
PCT Pub. Date: Sep. 7, 2018

(65) Prior Publication Data
US 2019/0375150 A1    Dec. 12, 2019

(30) Foreign Application Priority Data
Feb. 28, 2017  (EP) ..................................... 17158281

(51) Int. Cl.
*B29C 64/118*  (2017.01)
*B29C 64/209*  (2017.01)
*B33Y 30/00*  (2015.01)

(52) U.S. Cl.
CPC .......... *B29C 64/118* (2017.08); *B29C 64/209* (2017.08); *B33Y 30/00* (2014.12)

(58) Field of Classification Search
CPC ... B29C 64/118; B29C 64/209; B29C 48/255; B33Y 30/00
See application file for complete search history.

(56) References Cited

U.S. PATENT DOCUMENTS 4,642,040 A   2/1987  Fox
5,121,329 A   6/1992  Crump
(Continued)

FOREIGN PATENT DOCUMENTS

WO   WO-2012135279 A1   4/2012
WO   WO-2016020150 A1   2/2016

OTHER PUBLICATIONS

International Search Report for PCT/EP2018/054791 dated Apr. 12, 2018.
(Continued)

*Primary Examiner* — Nahida Sultana
*Assistant Examiner* — Mohamed K Ahmed Ali
(74) *Attorney, Agent, or Firm* — Jed C. Benson

(57) ABSTRACT

The invention relates to a print head (100) for an additive fused deposition modelling method having a thermoplastic construction material, comprising:—at least one inlet (10) for receiving a construction material (11) into the print head;—at least one melt region, for melting the construction material (11), which is arranged downstream of the inlet (10) and is fluidically connected, at least temporarily, to the inlet (10); and—at least one first outlet (30) that is fluidically connected, at least temporarily, to the melt region (20), for discharging melted construction material (12) out of the melt region (29) at a first discharge rate; wherein—the print head (100) also comprises at least one second outlet (40) that is
(Continued)

fluidically connected, at least temporarily, to the melt region (20) for discharging melted or non-melted construction material (11, 12) out of the melt region (20) at a second discharge rate; and—the first discharge rate can be influenced by a first discharge rate influencing device (50) for the melted construction material (12).

8 Claims, 6 Drawing Sheets

(56) References Cited

U.S. PATENT DOCUMENTS

| | | | |
|---|---|---|---|
| 2002/0113331 A1* | 8/2002 | Zhang | B29C 41/003 |
| | | | 264/40.1 |
| 2012/0322154 A1* | 12/2012 | Park | C12M 25/14 |
| | | | 435/395 |
| 2014/0070461 A1 | 3/2014 | Pax | |
| 2017/0023391 A1 | 7/2017 | Budge | |
| 2017/0210069 A1* | 7/2017 | Stubenruss | B29C 64/118 |

OTHER PUBLICATIONS

Written Opinion of the International Searching Authority for PCT/EP2018/054791 dated Apr. 12, 2018.

* cited by examiner

PRINT HEAD, METHOD AND SYSTEM FOR 3D PRINTING HAVING VARIABLE DISCHARGE RATE

CROSS-REFERENCE TO RELATED APPLICATIONS

This application is a national stage application (under 35 U.S.C. § 371) of PCT/EP2018/054791, filed Feb. 27, 2018, which claims benefit of European Application No. 17158281.0, filed Feb. 28, 2017, both of which are incorporated herein by reference in their entirety.

The present invention relates to a printing head for an additive melt layering process with a thermoplastic construction material, comprising at least one inlet for admitting a construction material into the inside of the printing head; at least one melting region arranged downstream of the inlet and at least intermittently fluidically connected to the inlet for melting the construction material and at least one first outlet at least intermittently fluidically connected to the melt region for discharging molten construction material from the melting region at a first discharge rate. The invention further relates to a process for producing an article in an additive melt layering process using such a printing head and to a system for an additive melt layering process with a thermoplastic construction material comprising such a printing head and a control unit.

Additive manufacturing processes are processes by means of which articles are constructed in layerwise fashion. They therefore differ markedly from other processes for producing articles such as milling, drilling or material removal. In the latter methods, an article is processed such that it obtains its final geometry by removal of material.

Additive manufacturing processes utilize different materials and process techniques to effect layerwise construction of articles. In so-called fused deposition modeling (FDM) or melt layering processes for example a thermoplastics filament is liquefied and deposited layerwise onto a movable construction platform using a nozzle. Upon solidification a solid article is formed. The nozzle and construction platform are controlled based on a CAD drawing of the article. An early patent document for this technology is U.S. Pat. No. 5,121,329. If the geometry of this article is complex, for example with geometric undercuts, support materials additionally have to be printed and, after completion of the article, removed again.

It may be the case that a layer of the article to be constructed comprises a plurality of regions which are not interconnected. It is then necessary in an FDM process to interrupt the deposition of the molten filament, to reposition the printing head and subsequently to restart the deposition of the molten filament.

The filamentous construction material is typically conveyed into the melting region of the printing head by roller propulsion or the like. The as yet unmolten material acts as a piston for the molten material so that the discharge rate of the molten material can be controlled by the propulsion for the feeding of the as yet unmolten material. This approach has the advantage that the printing head may be simple in construction. However, the disadvantage is that halting filament extrusion may be effected only by halting the introduction of unmolten construction material. This increases the risk that material continues to issue from the printing head during repositioning of the printing head which has the result that material threads unacceptable for successful 3-D printing remain between the end position of the printing head and the new starting position of the printing head.

Even if a closure mechanism at the hot outlet ("hot end") of the printing head were to prevent issuance of material during repositioning there remains a further problem: the increase in internal pressure in the melting region of the printing head upon resumption of material deposition. This pressure increase, can initially result in unintentional issuance of an excessively large amount of molten construction material.

An additional aspect in FDM processes is furthermore the residence time of the molten material in the melting zone. If a thermoplastic polymer is held above a certain temperature for an excessive length of time the risk of chain fragmentation and/or crosslinking, and thus impairment of the processing properties and mechanical properties of the polymer, increases.

So-called circulating extruders circulate molten material, thus allowing pressure variations at the outlet of the extruder to be reduced. An example thereof is described in U.S. Pat. No. 4,642,040 A.

A further example for a short residence time of the molten material in the discharge zone of the printing head is disclosed in WO 2012/135279 A1. An additive production system for printing a chocolate praline comprises a plate, a recirculation loop for circulating chocolate material and for heat treating the chocolate material. A printing head is adapted for receiving at least a portion of the chocolate material from the recirculation loop and for extruding the chocolate material and depositing it on the plate. Based on commands from a control unit at least a portion of the chocolate is printed.

The object is achieved in accordance with the invention by a printing head as claimed in claim 1. Advantageous embodiments are specified in the subsidiary claims. They may be combined as desired, unless the opposite is apparent from the context.

A printing head according to the invention for an additive melt layering process with a thermoplastic construction material comprises:
at least one inlet for admitting a construction material into the inside of the printing head;
at least one melting region arranged downstream of the inlet and at least intermittently fluidically connected to the inlet for melting the construction material;
and
at least one first outlet at least intermittently fluidically connected to the melt region for discharging molten construction material from the melting region at a first discharge rate;
wherein
the printing head further comprises at least one second outlet at least intermittently fluidically connected to the melt region for discharging molten or unmolten construction material from the melting region at a second discharge rate;
and
the first discharge rate can be influenced by a first discharge rate influencer for the molten construction material.

The printing head according to the invention has the advantage that the residence time of molten construction material in the melting zone can be minimized while at the same time the pressure inside the melting zone is subject to smaller variations. This is particularly advantageous when material discharge is to be halted during repositioning of the printing head. This makes it possible to increase the precision of material discharge upon resumption of the printing operation.

The printing head is employable in an additive melt layering process. FDM processes in particular are concerned. The construction material may in principle contain any thermoplastic polymers. Preference is given to those which when subjected to relatively lengthy thermal stress markedly alter their properties via thermal chain transfer processes (transesterification, transurethanization, transaddition etc.) within polymer chains but also between different polymer chains. Such thermoplastics benefit in particular front readily controlled processing times and examples include thermoplastic polyesters, polycarbonates, polyamides and polyurethanes, in particular thermoplastic polyurethanes and thermoplastic polyurethane elastomers.

To admit the filament or granulate form construction material the printing head has an inlet. After passing through the inlet the construction material arrives in a melting region where it is melted. The inlet is at least intermittently fluidically connected to the melting region. If a temporary fluidic separation is desired this may be achieved inter ilia via a valve or a piston.

The molten construction material may be discharged from the printing head via a first outlet. This first outlet is at least intermittently fluidically connected to the melt region, for example via a controllable valve. When the fluidic connection is interrupted no molten construction material issues from the first outlet. The first outlet is designed for discharging construction material for producing the desired article in the melt layering process. The amount of the molten construction material exiting the first outlet per unit time is expressed with the first discharge rate, for example in the units of milligrams per second.

The first discharge rate can be influenced by a first discharge rate influencer for the molten construction material. Suitable apparatuses include all apparatuses with which the rate of material discharge from the first outlet can be indirectly or controlled.

The printing head further comprises a second outlet which is at least intermittently fluidically connected to the melting region. Material issues from said outlet at a second discharge rate. In contrast to the first outlet this outlet is not designed for material issuing from it to contribute to the construction of the desired article. On the contrary the second outlet can function as a pressure release outlet if no material is to exit the first outlet.

The first discharge rate and the second discharge rate may each independently, but not simultaneously, be zero. It is preferable when the first discharge rate and the second discharge rate sum to a constant value.

Embodiments and further aspects of the invention are described hereinafter. They may be combined as desired, unless the opposite is apparent from the context.

In a preferred embodiment the second discharge rate can be influenced by a second discharge rate influencer for the molten or unmolten construction material. The second discharge rate is then controllable not only indirectly via the first discharge rate influencer but also directly.

In a further preferred embodiment the first discharge rate influencer is a switchable valve adapted for fluidically connecting to one another or separating from one another the melting region and the first outlet. This may be carried out under the command of a control unit in accordance with the printing operation for the respective layer.

In a further preferred embodiment the first discharge rate influencer is a propulsion means for conveying the construction material through the inlet into the inside of the printing head. This makes it possible to employ a conventional roller propulsion means such as is already present in FDM printing heads.

In a further preferred embodiment the second discharge rate influencer is a switchable valve adapted for fluidically connecting to one another or separating from one another the melting region and the second outlet. This may be carried out under the command of a control unit in accordance with the printing operation for the respective layer.

In a further preferred embodiment the second outlet is at least intermittently fluidically connected to the inlet. This allows for reuse of material not used for constructing the article.

In a further preferred embodiment the first outlet is in the form of a plurality of coaxial individual outlets spaced apart from one another and the individual outlets are adapted such that molten or unmolten construction material is discharged through each individual outlet at the same discharge rate. This makes it possible to achieve parallelization of the 3-D printing operation. The distance of an individual outlet from its nearest neighbor is advantageously chosen such that it is greater than the greatest width of the article to be printed in parallel. 2, 3, 4, 5, 6, 7, 8, 9 or more individual outlets may be present. It is possible for the individual outlets to be arranged in two dimensions and offset with respect to one another and for the distance between the centers of two neighboring individual outlets to be less than or equal to the diameter of the second outlet. The arrangement of the individual outlets is preferably in offset rows. This allows efficient deposition of construction material onto large areas.

In a further preferred embodiment there is provided in addition to the first outlet at least one further outlet coaxial with the first outlet having a separately controllable discharge rate influencer through which molten construction material may be discharged at a discharge rate. 1, 2, 3, 4, 5, 6, 7, 8, 9 or more such individually controllable further outlets may be present. The individual outlets may have the same opening cross section or else different opening cross sections.

A further aspect of the present invention is a process for producing an article in an additive melt layering process, comprising the steps of:

I) printing head to obtain a layer of the construction material which corresponds to a first selected cross section of the article;

II) applying a filament of the at least partially molten construction material to a previously applied layer of the construction material using a printing head to obtain a further layer of the construction material which corresponds to a further selected cross section of the article and which is joined to the previously applied layer;

III) repeating step II) until the article is formed;

wherein the construction material comprises a meltable polymer;

wherein the applying of the filament at least in step II) is carried out by means of a printing head according to the invention by discharging molten construction material from the first outlet of the printing, head at a first discharge rate; and before, during and/or after performing a step II) a control unit controls whether the printing head requires repositioning without discharging of molten construction material and, if this is the case, before repositioning controls the first discharge rate influencer of the printing head such that the first discharge rate is zero and the second discharge rate is greater than zero and after repositioning controls the first discharge rate influencer of the printing head such that the first discharge rate is zero greater than zero.

In the process according to the invention an article is constructed layerwise. The process is accordingly a melt layering or fused deposition modeling (FDM) process. If the number of repetitions for the applying is sufficiently low the article to be constructed may also be referred to as a two-dimensional article. Such a two-dimensional article can also be characterized as a coating. The construction thereof to be formed may comprise performing ≥2 to ≤20 repetitions for the applying for example.

An electronic model of the article to be formed is advantageously held in a CAD program. The CAD program can then calculate cross sections of the model that become cross sections of the article by application of the filament.

The individual filaments that are applied may have a diameter of ≥25 μm to ≤5000 μm.

Step I) of the process relates to the construction of the first layer on a carrier. Step II), in which further layers are applied to previously applied layers of the construction material, is subsequently performed until the desired end result in the form of the article is obtained. The at least partially molten construction material joins with existing layers of the material in order to construct a structure in the z direction.

The temperature at which the at least partially molten construction material is applied is preferably at least 10° C. above the melting temperature and preferably <200° C. above the upper temperature in the melting range of the meltable polymer.

In addition to the meltable polymer the construction material may comprise further additives such as fillers, stabilizers and the like, but also further polymers. The total content of additives in the construction material may be for example ≥0.1% by weight to ≤80% by weight, preferably ≥0.5% by weight to ≤50% by weight.

In the process according to the invention it is provided that at least in step II), preferably over the entire process, the applying of the filament is carried out by means of a printing head according to the invention. Here, (according to the particular selected cross section of the article) molten construction material is discharged from the first outlet of the printing head at a first discharge rate.

While the process according to the invention is being performed a control unit controls whether the printing head requires repositioning. This may be the case upon changing to the next layer of the article or when a layer of the article comprises a plurality of regions which are not interconnected. In conventional FDM printing processes filament propulsion would then be halted before being restarted once the new printing head position had been arrived at. This has the disadvantage that the construction material remains in the melting zone for an unnecessarily long time and that upon restarting filament propulsion a sudden pressure increase in the printing head can bring about an unintentionally high initial discharge rate.

By contrast, in the process according to the invention the first discharge rate is reduced to zero under the instruction of the control unit in the printing head so that material no longer issues from the first outlet. Instead the second discharge rate is set to a value greater than zero so that material moving in the printing head now issues from the second outlet instead of through the first. This allows the material conveying mechanism in the printing head to operate without interruption. It is preferable when the first discharge rate and the second discharge rate sum to a constant value for the duration of the process according to the invention. After the repositioning material can once more be discharged from the first outlet for further construction of the article.

In a preferred embodiment of the process the first discharge rate remains within an interval of 20%, preferably ±10%, more preferably ±5% around a predetermined value for ≥25% of the total duration of the process.

In a further preferred embodiment of the process the material throughput through the printing head remains constant for ≥50%, preferably ≥75%, more preferably ≥95% of the total duration of the process. The material throughput through the printing head is here to be understood as meaning the sum of all discharge rates. A constant material throughput allows for better coordination of heating and material flow in the printing head. In this case the term "constant" includes a variation of around ±10%, preferably ±5%, around a predetermined value.

In a further preferred embodiment of the process the pressure inside the melting region exerted by the molten construction material deviates from the average pressure exerted by the molten construction material inside the melting region by ≤50% for ≥25% of the total duration of the process.

In a further preferred embodiment of the process the average residence time of the molten construction material inside the melting zone is ≤3 minutes. This average residence time is preferably ≤2 minutes, more preferably ≤1 minute. The measured residence time profile can correspond to a function with a confidence interval of >0.9 after repeated statistically distributed measurements of in each case <20 minutes (preferably <10 minutes) within the construction time.

A further preferred embodiment of the process employs a printing head according to the invention in which there is provided in addition to the first outlet at least one further outlet coaxial with the first outlet and having a separately controllable discharge rate influencer through which molten construction material is discharged at a discharge rate and each discharge rate influencer is controlled separately.

The present invention further relates to a system for an additive melt layering process with a thermoplastic construction material, comprising a printing head and a control unit, wherein the printing head is a printing head according to the invention and the control unit is adapted for executing a process according to the invention.

The present invention is more particularly elucidated with reference to the figures which follow without, however, being limited thereto. In the drawings.

Figure 1:
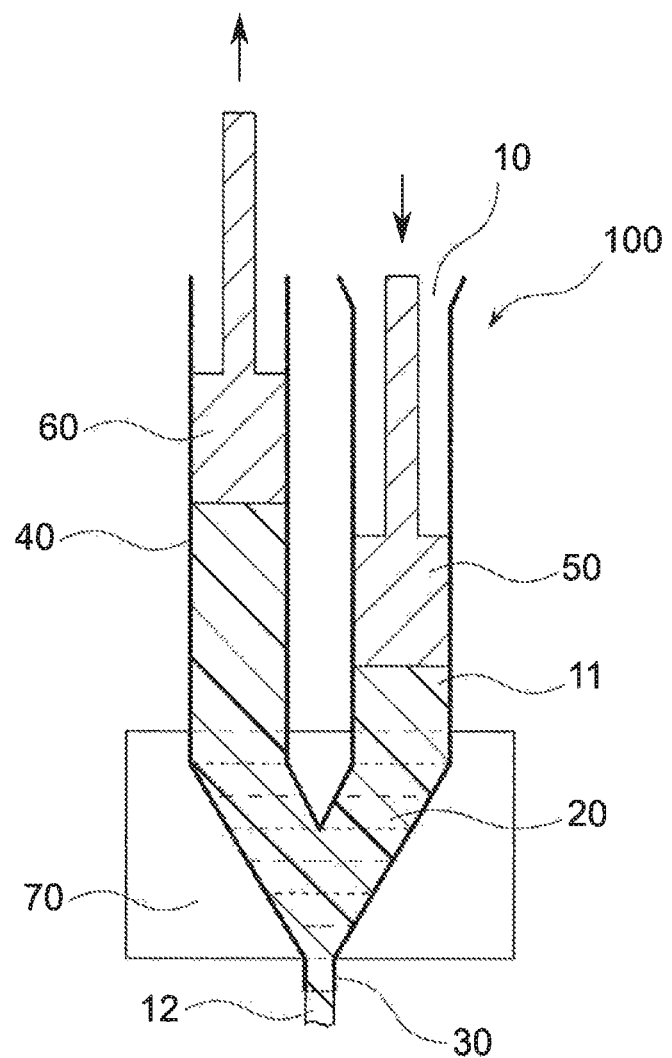
FIG. 1-4 show inventive printing heads

FIG. 1 shows a schematic diagram of an inventive printing head 100. This printing head has two parallel limbs of which the limb shown on the right-hand side in the figure has an inlet 10 through which a thermoplastic construction material may be charged into the printing head in filament, rod or granulate form. The piston 50 is removed for charging the construction material and replaced after charging so that the movable piston 50 can exert pressure on the construction material 11.

The heating element 70 arranged around the printing head melts the construction material 11 in a heated melting region 20. A downward movement of the piston 50 can convey the construction material 12 melted in the melting region 20 through the first outlet 30 and thus contribute to the construction of an article in an additive melt layering process (FDM process). In addition, molten construction material 12 may also be redirected into the second limb, shown on the left-hand side in FIG. 1. This limb has the second outlet 40 through which the thus-redirected molten or re-solidified construction material can exit the printing head. An optional movable piston 60 can seal the second outlet 40 and move in the opposite direction to the first piston 50.

The construction material exits the printing head through the first outlet 30 with a first discharge rate and the second outlet 40 with a second discharge rate. In the simplest case, in the absence of the second piston 60, the movement of the first piston 50 in the direction of the melting region 20 determines the first (and also the second) discharge rate. Thus the first piston 50 is a first discharge rate influencer for the molten construction material 12 in the context of the invention. In the presence of the second piston 60 as shown in FIG. 1 said piston can oppose the movement of the construction material from the second outlet 40 through a faster or slower movement and is thus a second discharge rate influencer for molten or unmolten construction material.

The cooperation of the first piston 50 and the second piston 60 also makes it possible to control the first discharge rate via the second discharge rate and vice versa. Thus for a constant downward movement of the first piston 50 altering the speed of the opposing movement of the second piston 60 makes it possible for the first discharge rate to be increased (second piston 60 moves faster) or decreased (second piston 60 moves slower).

Regarding the aspect of the internal pressure in the printing head and in particular of the pressure prevailing in the melting region 20 this pressure may be kept constant in the printing head according to the invention despite the first discharge rate being alterable and settable to zero.

Figure 2:
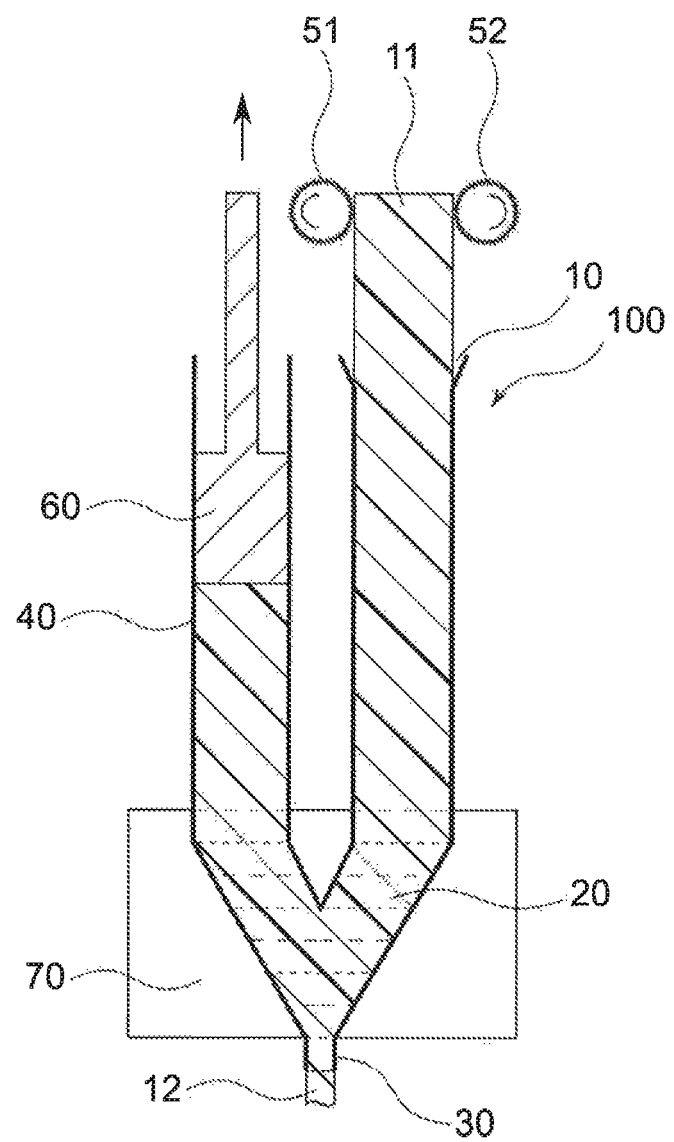

FIG. 2 shows a schematic diagram of a further inventive printing head 100. In a variation of the configuration of FIG. 1 the propulsion rollers 51 and 52 assume the function of the first discharge rate influencer by conveying construction material 11 in the form of a filament through the inlet 10 into the melting region 20 of the printing head 100.

Figure 3:
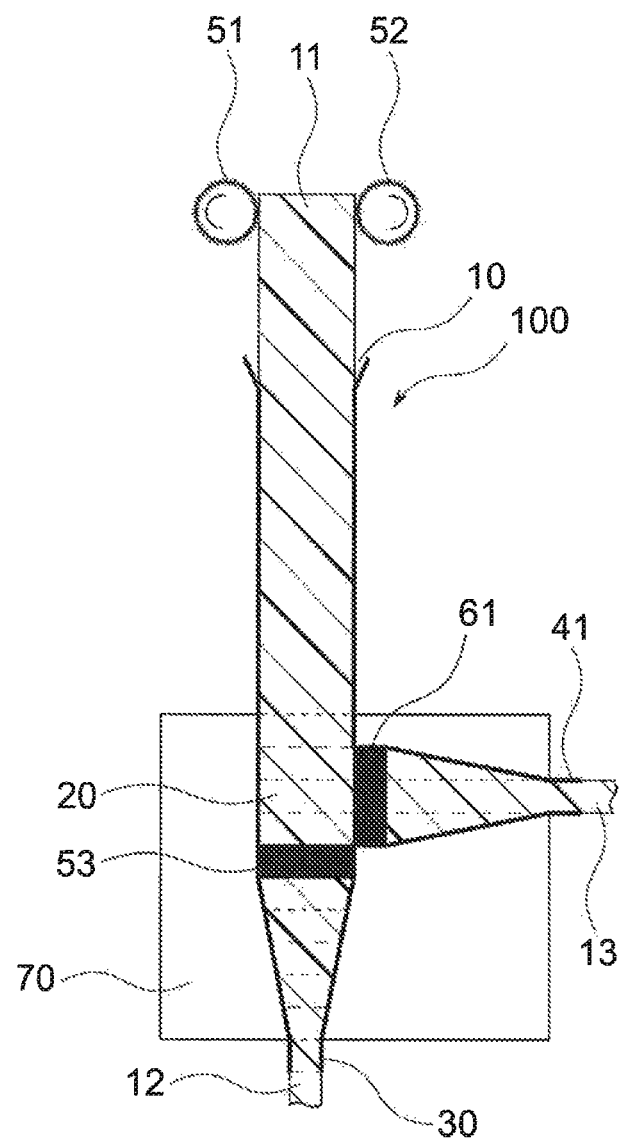

The discharge rate influencer(s) may also be switchable valves. This is shown schematically in FIG. 3. The printing head 100 has an inlet 10 through which the construction material 11 propelled by the propulsion rollers 51 and 52 arrives in the melting region 20. The heating element 70 introduces the heat necessary for melting the construction material into the melting region 20. The issuing of molten construction material 12 out of the first outlet 30 is influenced by the switchable valve 53. It is optionally also possible to provide as a second discharge rate influencer for influencing the rate at which molten construction material 13 issues from the second outlet 41 a further switchable valve 61. Control of the switchable valves 53, 61 is assumed by a control unit (not shown).

Figure 4:
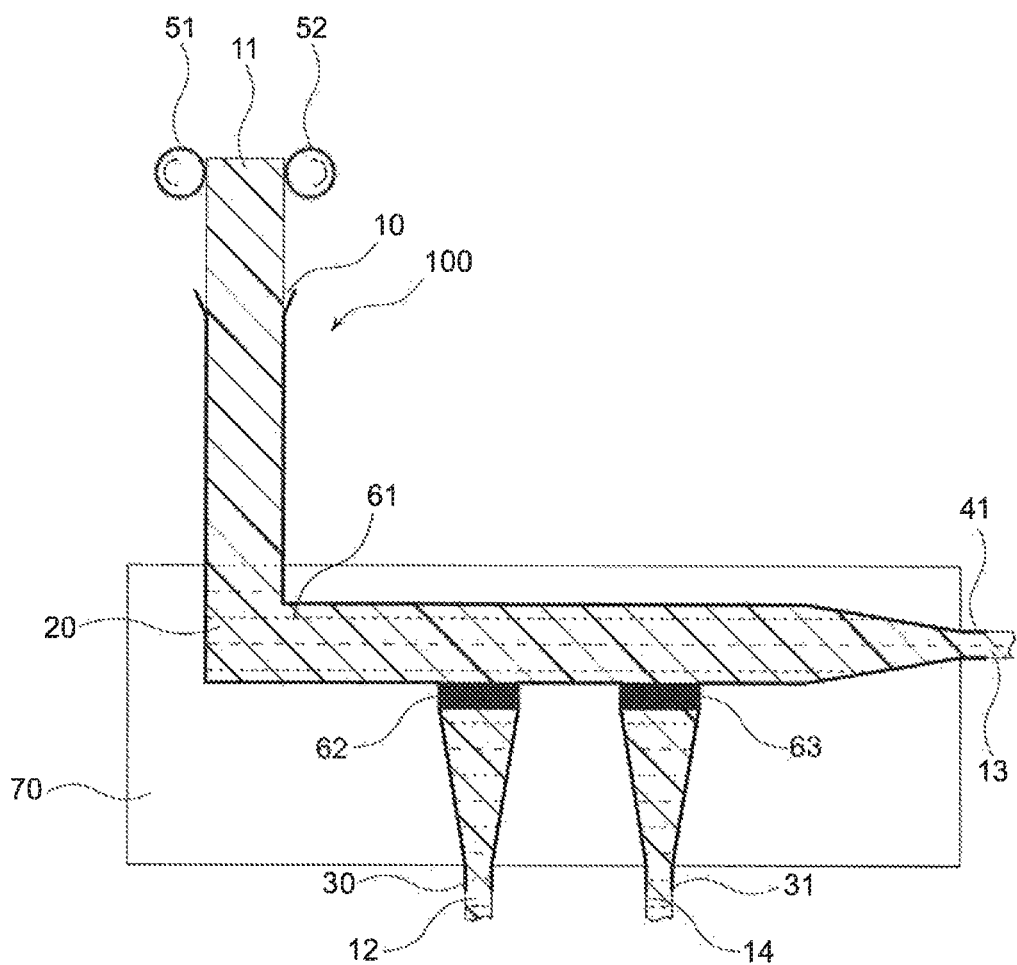

FIG. 4 shows a schematic diagram of a further inventive printing head 100. The printing head 100 has an inlet 10 through which the construction material 11 propelled by the propulsion rollers 51 and 52 arrives in the melting region 20. The heating element 70 introduces the heat necessary for melting the construction material into the melting region 20. In addition to the first outlet 30 and the second outlet 41 this printing head also has a third outlet 31 arranged coaxially with the first outlet 30. Molten construction material 12 issues from the first outlet 30 at a first discharge rate. Similarly, molten construction material 13 issues from the second outlet 41 at a second discharge rate and molten construction material 14 issues from the third outlet 31 at a third discharge rate.

The propulsion rollers 51 and 52 have the function of the second discharge rate influencer. Switchable valves 62 and 63 assume the function of the first and third discharge rate influencers. The second discharge rate may furthermore be altered by cooperation of the first, second and third discharge rate influencers. At a constant conveying rate for the filamentous construction material, valves 62 and/or 63 may be opened to conduct molten construction material 13 away from the second outlet 41.

Figure 5:
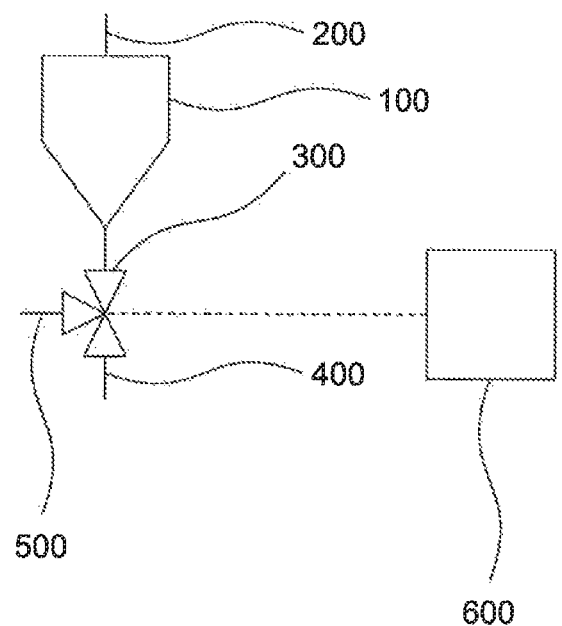
FIG. 5-7 show inventive systems comprising printing head and control unit

FIG. 5 shows a schematic diagram of a system according to the invention with cooperation of the printing head and the control unit. The printing head 100 receives in its melting region the material stream 200 which may in particular be a filament of a thermoplastic polymer. The thermoplastic polymer is melted in the melting region. The material stream of the molten material exits the melting region and enters a three-way valve 300. In the terminology of the invention the three-way valve 300 is both the first discharge rate influencer and the second discharge rate influencer. This three-way valve 300 is controlled by the control unit 600 and under instruction from this control unit 600 can divert the material stream of the molten material to the material streams 400 and/or 500. If desired the three-way valve 300 can also block the incoming material stream so that no material issues from the three-way valve 300. The material stream 400 is intended to be that material stream which forms the article to be produced by the additive melt layering process. The material stream 500 does not take part in the additive melt layering process.

The option of dividing the incoming material stream over the two material streams 400 and 500 allows the material stream entering the three-way valve 300 to exit the melting region of the printing head at a constant rate. If material is to be deposited for construction of the article to be produced the control unit 600 switches the three-way valve 300 such that for example 100% of the incoming material stream exits the valve via material stream 400.

If by contrast the printing head is to assume a new position relative to the article to be constructed and is not to deposit any material en route thereto the control unit 600 switches the three-way valve 300 such that for example 100% of the incoming material stream exits the valve via material stream 500 and accordingly is not deposited on the article to be constructed.

If the printing head were not to have this option the material stream 200 would have to be halted before the repositioning and restarted upon resumption of material deposition. However, this would cause pressure variations in the printing head which are not conducive to quantitatively controlled discharge of the molten material. The present invention avoids these problems.

The three-way valve 300 is not limited to diverting 100% of the incoming material stream to material stream 400 or to material stream 500. Any desired graduation of the ratios of the material streams 400 and 500 to one another may also be assumed. This is advantageous if during printing of fine structures the printing head moves only slowly relative to the article to be constructed and correspondingly little material is to be deposited. Here too, undesired pressure jumps within the printing head can be avoided.

Figure 6:
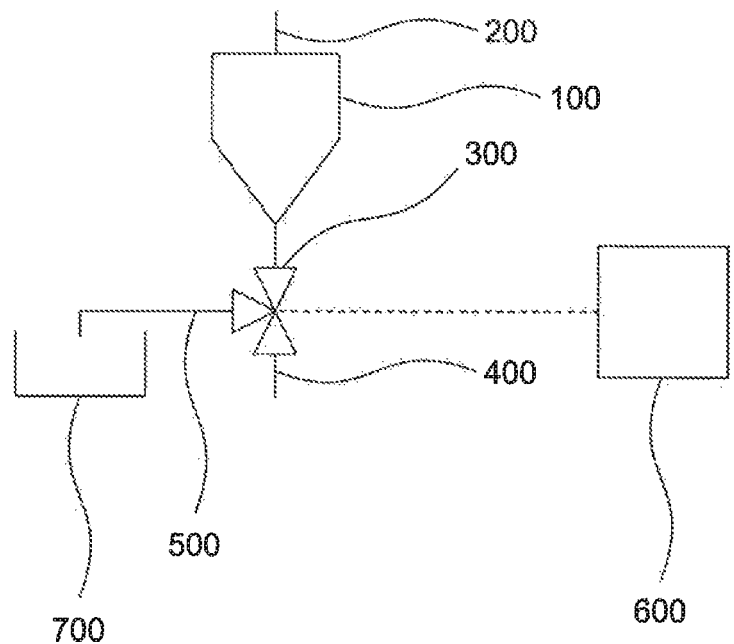

FIG. 6 shows a schematic diagram of a further system according to the invention with cooperation of the printing head and the control unit. Based on the system according to FIG. 5 the figure shows how the material stream 500 not intended for construction of the article to be produced in the additive melt layering process is passed into a collection vessel 700. The material collected in the collection vessel 700 may be sent for reuse.

Figure 7:
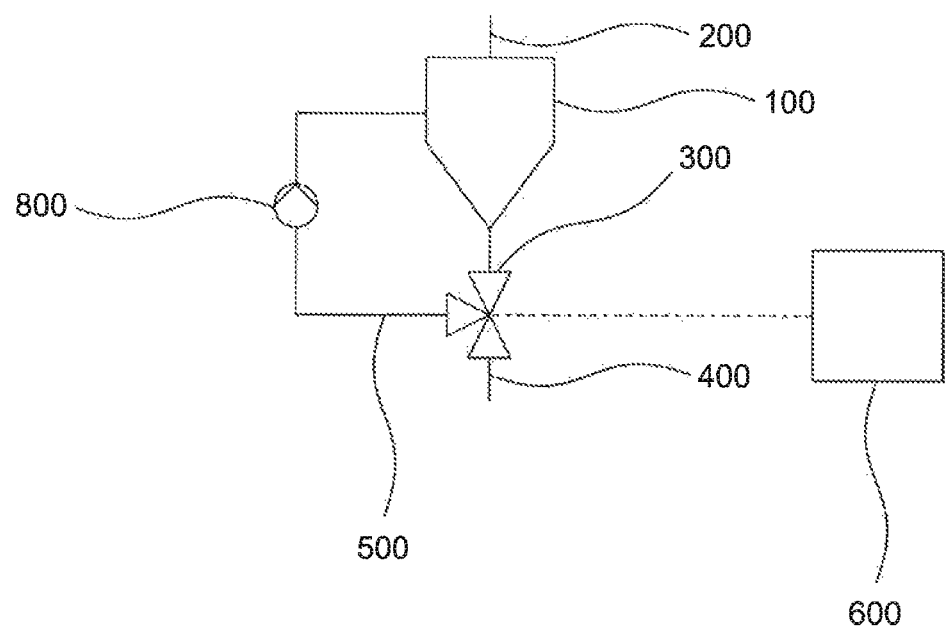

FIG. 7 shows a schematic diagram of a further system according to the invention with cooperation of the printing head and the control unit. Based on the system according to FIG. 5 the figure shows how the material stream 500 not intended for construction of the article to be produced in the additive melt layering process is recycled back into the melting region. This may be assisted by an optional pump 800. In order to prevent solidification of the material the conduits for the material stream 500 may be thermally insulated and/or heated.

The invention claimed is:

1. A printing head for an additive melt layering process with a thermoplastic construction material, comprising:
   at least one inlet for admitting a construction material into the inside of the printing head;
   at least one melting region arranged downstream of the inlet and at least intermittently fluidically connected to the inlet for melting the construction material;
   at least one first outlet at least intermittently fluidically connected to the melting region for discharging molten construction material from the melting region at a first discharge rate;
   at least one second outlet at least intermittently fluidically connected to the melt region for discharging molten or unmolten construction material from the melting region at a second discharge rate, wherein the at least second outlet is an alternative outlet to the at least one first outlet, the at least one second outlet being operable as a pressure-release outlet when discharging of molten construction material from the at least one first outlet is stopped; and a first discharge rate influencer configured for influencing the first discharge rate of the molten construction material; wherein the first discharge rate influencer is a switchable valve adapted for fluidically connecting to one another or separating from one another the melting region and the first outlet.

2. The printing head as claimed in claim 1, further comprising a second discharge rate influencer for influencing the second discharge rate of the molten or unmolten construction material.

3. The printing head as claimed in claim 1, wherein the first discharge rate influencer is a propulsion means for conveying the construction material through the inlet into the inside of the printing head.

4. The printing head as claimed in claim 2, wherein the second discharge rate influencer is a switchable valve adapted for fluidically connecting to one another or separating from one another the melting region and the second outlet.

5. The printing head as claimed in claim 1, wherein the second outlet is at least intermittently fluidically connected to the inlet.

6. The printing head as claimed in claim 1, wherein the first outlet is in the form of a plurality of coaxial individual outlets spaced apart from one another and the individual outlets are adapted such that molten or unmolten construction material is discharged through each individual outlet at the same discharge rate.

7. The printing head as claimed in claim 6, wherein the individual outlets are arranged in two dimensions and offset with respect to one another and in that the distance between the centers of two neighboring individual outlets is less than or equal to the diameter of the second outlet.

8. The printing head as claimed in claim 1, wherein there is provided in addition to the first outlet at least one further outlet coaxial with the first outlet having a separately controllable discharge rate influencer through which molten construction material may be discharged at a discharge rate.

\* \* \* \* \*